Figure 2:
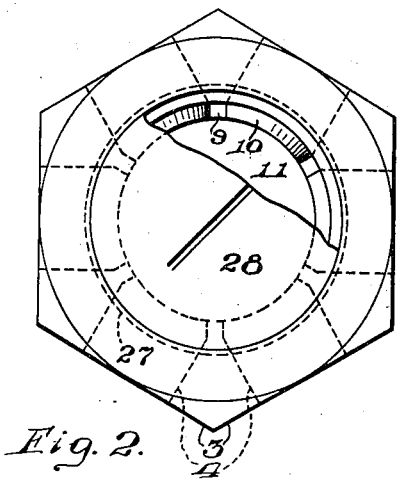

Feb. 5, 1935.   R. U. CHADWICK   1,990,371
COMBINED VACUUM AND RELIEF VALVE
Filed May 25, 1934

INVENTOR
Richard U. Chadwick,
BY
ATTORNEY

Patented Feb. 5, 1935

1,990,371

UNITED STATES PATENT OFFICE 1,990,371

COMBINED VACUUM AND RELIEF VALVE

Richard U. Chadwick, Philadelphia, Pa.

Application May 25, 1934, Serial No. 727,459

2 Claims. (Cl. 277—45)

The object of the invention is to provide improvements in combined vacuum and relief valves, but more particularly in providing improvements over the valve, which is illustrated, described, and claimed in my U. S. Letters Patent Nos. 659,578, issued Oct. 9, 1900 and 1,229,885, issued June 12, 1917.

These valves are especially designed for use upon the cylinders of steam drying machines, employed for the purpose of drying various products in the textile industry, and their function is to maintain within a predetermined latitude the proper pressure within each cylinder, necessary to insure the correct heat for drying such products as speedily as may be feasible consistent with safety, while retention of excess steam pressure and resulting temperatures above such predetermined degree is prevented by the automatic release of the valve, and in the same manner vacuum or negative pressures, resulting from the cooling of the cylinders and condensation of the steam, are relieved by a reverse motion of the valve, or more correctly speaking by an auxiliary valve within the same casing or housing.

As these valves are normally set in a horizontal position, axially directed longitudinally from the end of a given cylinder, a serious defect in previous constructions has resided in the fact that sudden release of steam pressure permitted scalding steam to be projected horizontally in the path of persons who might be passing the machine at the time, frequently with painful and serious results to such persons.

Another object of the invention is therefore to provide an improved casing for such valves, which is so designed as to positively deflect the steam when escaping, and to direct it laterally of the longitudinal axis of the said casing, or substantially parallel with instead of transverse to the path of operators or others, who may be moving along the side of the machine equipped with the valve.

A further object is to provide in such a valve structure the combination of a concave disk baffle which operates to retard the force of steam when blowing off, the diameter of such disk being greater than that of the valve disk, which normally blocks the escape of steam or other fluid under pressure, for the purpose of reducing the pressure of steam when escaping past the same, and before such steam emerges thru the discharge outlets.

Still another object is to provide in such a valve the combination of a casing, having upon its inner surface circumferentially spaced spiral ribs, with a concave disk slidable with respect to said ribs, and operative to permit the rapid escape of steam under unusually high pressures, the spaces between said ribs permitting both the escape of steam under pressure, and also the ingress of air which replaces the partial vacuum, produced by the condensation of steam upon the cooling of the cylinder to which the valve is attached, the spiral arrangement of said ribs serving to distribute their ultimate wear upon said baffle disk, and thereby prevent the wearing of recesses in said disk as is liable to occur when straight ribs are employed parallel to the axis of the casing.

Figure 3:
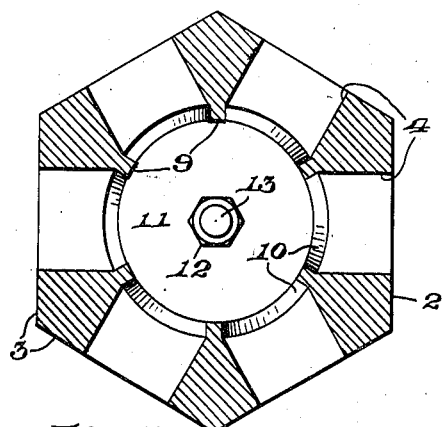
Figure 1:
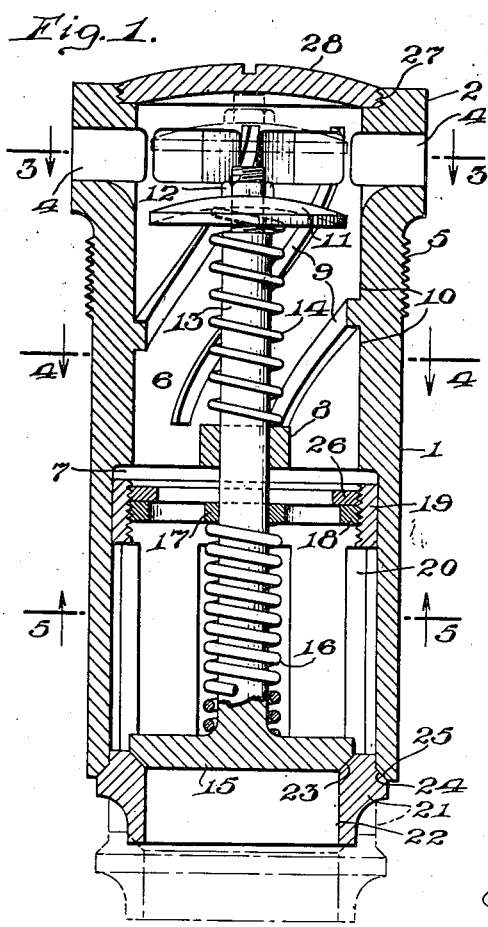
Figure 4:
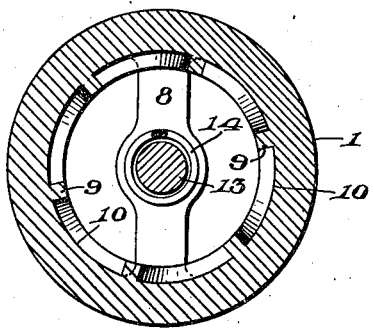
Figure 5:
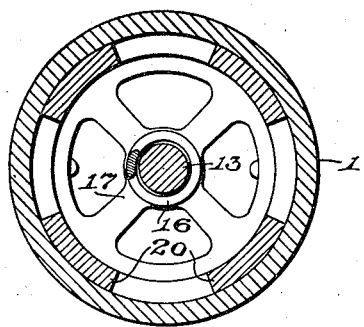

With these and other objects in mind, the invention comprises further details of construction and operation, which are fully brought out in the following description, when read in conjunction with the accompanying drawing, in which Fig. 1 is a longitudinally transverse section of an improved valve comprising one embodiment of the invention;

Fig. 2 is an end elevation of the same, with a portion of the sealing disc broken away; and Figs. 3, 4, and 5 are transverse sections on the lines 3—3, 4—4, and 5—5 of Fig. 1, respectively.

Referring to the drawing, the embodiment of the invention here illustrated comprises a casing 1, one end portion 2 of which is preferably enlarged radially and made of polygonal cross section, in order to provide wrench-engaging surfaces 3 of sufficient transverse measurement, to permit the extension thru said end portion of radially directed, circumferentially spaced, discharge apertures 4, while in the neighborhood of said enlarged portion the outer surface of said casing is provided with screw threads 5, for securing the valve as a unit to and within a correspondingly threaded aperture in a drying cylinder of textile machinery, or the like (not shown).

The interior of said casing is divided longitudinally into two compartments 6 and 7, partially separated from each other by means of a transversely extending rib 8, and communicating with each other upon the laterally opposite sides of said rib. The side walls of the first compartment 6 are provided with inwardly projecting, spirally extending, integral ribs 9, between which are fluid-passing channels 10, while the radially inner surface of said ribs cooperate to serve as a guide for the longitudinal movement of a concave baffle disc 11, adjustably secured by means of a nut or the like 12 upon the adjacent end of a valve pin 13, said adjacent end portion of said pin being surrounded by a spiral compression spring 14, which is normally under tension between said baffle disc and said casing rib.

Said pin 13 extends slidably thru said rib into the second casing compartment 7, and carries upon its opposite end a radially enlarged integral valve head 15, against which is normally pressed a spiral spring 16, the opposite end of said spring abutting against the central portion 17 of an adjustable spider 18, which is supported in threaded engagement with the inner correspondingly threaded surface of one cylindrical end portion 19 of a valve cage, which also comprises circumferentially spaced ribs 20, which extend from said cylindrical portion 19 to and are integrally connected at their opposite ends by a cylindrical auxiliary valve member 21.

Said auxiliary valve member is provided with a relatively large axially positioned bore 22, surrounded by a conical valve seat 23, against which the valve head 15 normally presses, while said valve member 21 is itself provided externally with a conical valve surface 24, which is normally pressed against the correspondingly shaped valve seat 25 of the free end portion of the casing 1 opposite to the polygonally shaped head 2, by virtue of the force of the compression spring 14. The tension upon the spring 16 is varied by longitudinally adjusting the position of the spider 17, while the desired tension upon said spring is readily maintained by means of an annular, centrally apertured ring 26, which is in threaded engagement with the inner surface of the end portion 19 of said valve cage, and operates as an internal locknut in binding engagement with said spider.

For replacing and/or adjusting the various elements comprising the mechanism of this improved double-acting valve, the polygonally shaped head 2 is provided with a centrally threaded aperture 27, in which is normally secured in any suitable manner a sealing disc 28. By and upon removing this disc, the nut 12 may be adjusted or even removed, in the latter case permitting the removal of the concave baffle 11 and the spring 14 from the pin 13, after which said pin and valve cage may be removed thru and from the opposite end of the valve casing 1. Thereupon, a re-adjustment of the tension of the spring 16 may be made by properly adjusting the spider 17 and locking ring or nut 26, or by removing said spider and ring, said spring 16, valve head 15 and said valve cage may be completely disassembled for cleaning, grinding, replacement, or adjustment, as may be desired.

In the operation of this device, operatively carried by and properly secured to a drying cylinder, or other device designed to contain steam under pressure at all times, and liable upon the cooling of said device and condensation of the steam therein to contain instead a partial vacuum, the polygonal head 2 protrudes beyond the outer wall of such cylinder or other device and the axes of the discharge apertures 4 radiate in a plane perpendicular to the axis of the valve unit, in such a manner that escaping steam is positively directed transversely to the said axis, instead of being permitted to emerge axially therefrom as in previous structures of this class, with the detrimental, disastrous and oft-times fatal results.

In operation, excess steam pressure lifts the valve 15 off its seat, permitting the steam to escape past said seat and between the ribs 20, thence thru the spider 18 and locking ring 26, thru the casing compartment 6, and outwardly thru the radially directed apertures or discharge orifices 4. If there is but a relatively mild escape of the steam, the baffle disc 11 moves but slightly within the limits of the guide ribs 9, retarding the otherwise relatively free flow of steam, but permitting the same to pass thru the channels 10 between said ribs. Whenever the rush of steam is under high pressure and sudden and of substantially greater volume, it raises the valve 15 well above its seat 23, so that the said baffle disk is thereby shifted within the limits of the spiral guide ribs, but more nearly adjacent to the sealing disk, permitting a less interrupted escape of steam, but still tending to baffle the same by causing it to swirl reversely upon itself, or against its general direction of flow, by reason of the concavity of said disk, after which the steam escapes still more freely thru the orifices 4. On the other hand, upon the cooling and condensation of the steam within the drying cylinder or the like, the resulting partial vacuum is readily relieved by the valve cage shifting from its seat 25, against the pressure of the spring 14, until the vacuum is substantially entirely relieved.

I am aware that the invention may be embodied in other specific forms without departing from the spirit or essential attributes thereof, and I therefore desire the present embodiment to be considered in all respects as illustrative and not descriptive, reference being had to the appended claims rather than to the foregoing description to indicate the scope of the invention.

Having thus described my invention what I claim as new and desire to secure by Letters Patent is:—

1. A valve, comprising a casing provided internally with spirally extending, radially inwardly projecting guide ribs and circumferentially spaced intervening channels, a baffle disc in slidable engagement with said ribs, radially disposed orifices in said casing, thru which fluid under pressure can discharge, after being retarded by said baffle and then passing thru said channels, a valve mechanism within said casing, said valve mechanism comprising a channelled valve cage in normal cooperation with a seating surface upon said casing, a valve in normal cooperation with a seating surface upon said cage, a valve stem carrying said last-named valve and slidable with respect to said cage and upon its opposite end supporting said baffle, and resilient means to normally maintain said cage and valve seated.

2. A valve, comprising the combination of a casing having an end wall provided with an aperture, side walls provided with radially directed discharge orifices, and internally provided with spirally directed integral guide ribs with intervening channels, a removable closure for said aperture, and a baffle disc in slidable engagement with said ribs and accessible thru said aperture when said closure is removed, a valve mechanism within said casing, said valve mechanism comprising a channelled valve cage in normal cooperation with a seating surface upon said casing, a valve in normal cooperation with a seating surface upon said cage, a valve stem carrying said last-named valve and slidable with respect to said cage and upon its opposite end supporting said baffle, and resilient means to normally maintain said cage and valve seated.

RICHARD U. CHADWICK.